United States Patent

Tappan

[11] 4,058,243
[45] Nov. 15, 1977

[54] CAR TOP LOAD CARRIER

[76] Inventor: Leonard E. Tappan, Rte. 3, Box 144, Edwardsburg, Mich. 49112

[21] Appl. No.: 681,321

[22] Filed: Apr. 29, 1976

[51] Int. Cl.² .............................................. B60R 9/08
[52] U.S. Cl. .............................. 224/42.1 H; 214/450; 403/292
[58] Field of Search ................. 214/450; 224/42.1 H, 224/42.1 R, 42.1 G, 42.44; 403/292; 211/189; 280/47.31; 296/100, 137 B

[56] References Cited

U.S. PATENT DOCUMENTS

| 2,624,588 | 1/1953 | Jones | 403/292 X |
| 2,746,769 | 5/1956 | Hoogendoorn | 403/292 X |
| 2,765,940 | 10/1956 | Nelson | 214/450 |
| 2,808,952 | 10/1957 | Nicholas | 214/450 |
| 2,817,344 | 12/1957 | Teeter | 296/100 X |
| 3,066,815 | 12/1962 | Johnson | 214/450 |
| 3,193,124 | 7/1965 | Essling | 214/450 |
| 3,229,838 | 1/1966 | Johnson | 214/450 |
| 3,871,540 | 3/1975 | Jenkins | 214/450 |

FOREIGN PATENT DOCUMENTS

| 623,890 | 10/1926 | France | 280/47.31 |

*Primary Examiner*—Robert J. Spar
*Assistant Examiner*—Winston H. Douglas
*Attorney, Agent, or Firm*—Oltsch & Knoblock

[57] ABSTRACT

A car top load carrier characterized by a rigid sectional support frame adapted to be mounted on the top of a vehicle and having spaced roller retaining tracks and means releasably interconnecting the frame sections, and a rigid load carrying member having a sectional frame journaling a plurality of track engaging rollers spaced along the length thereof and supporting wheels journaled at one end thereof.

6 Claims, 11 Drawing Figures

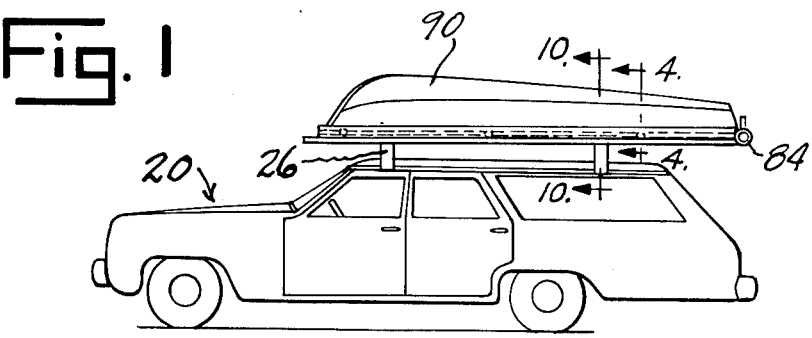
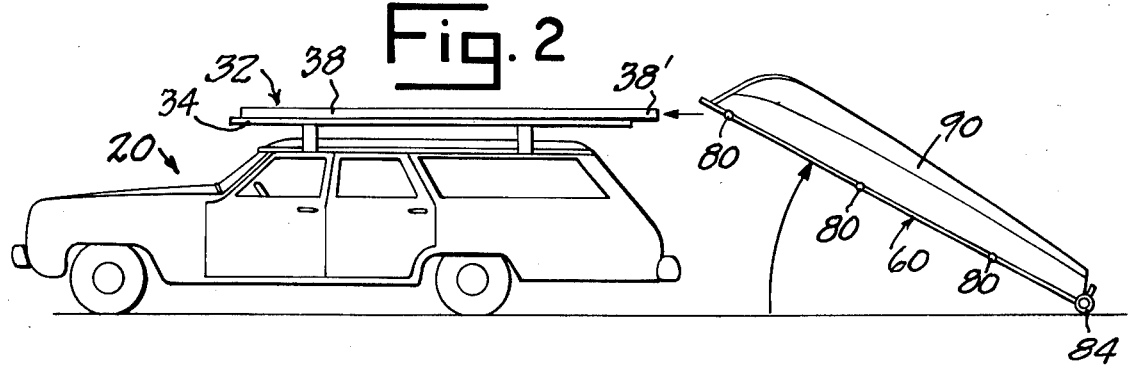
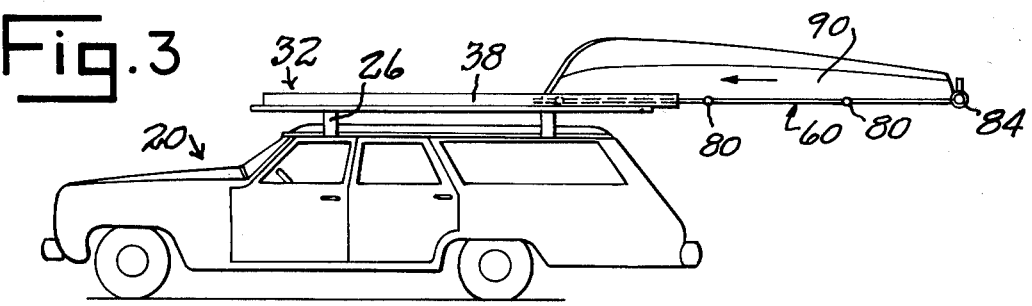
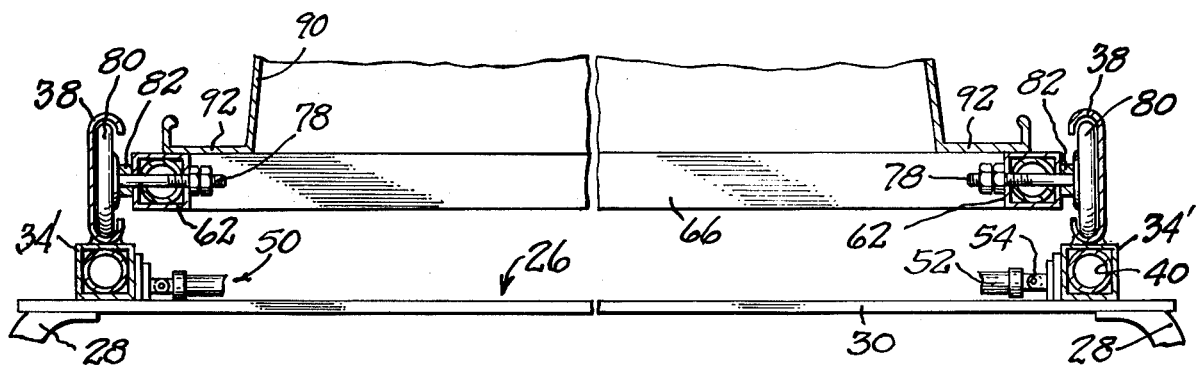

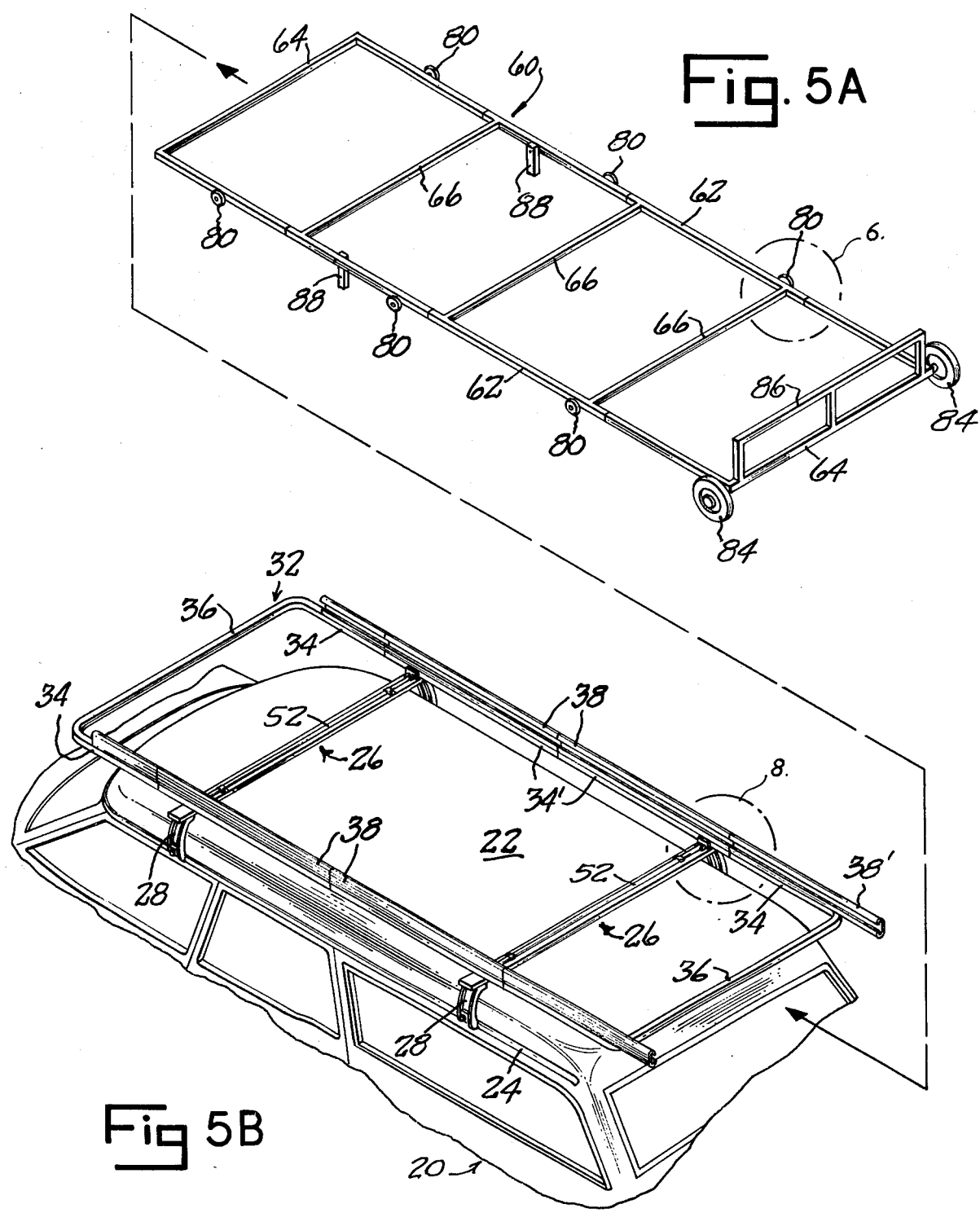

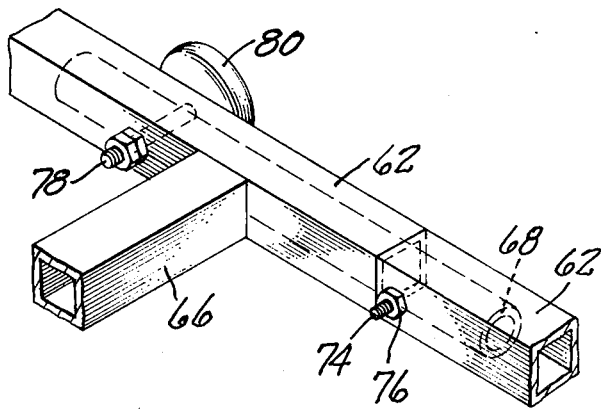
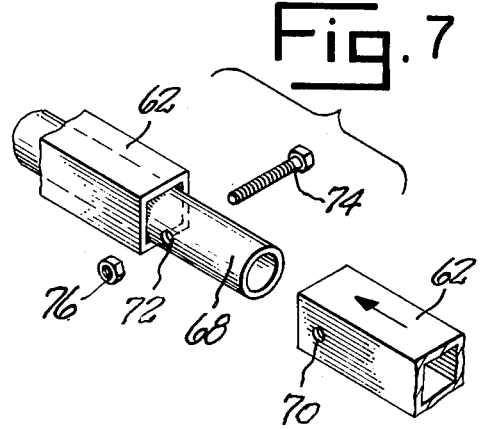
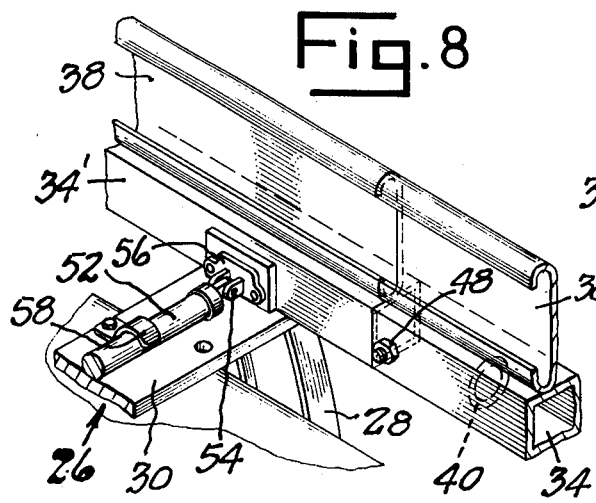
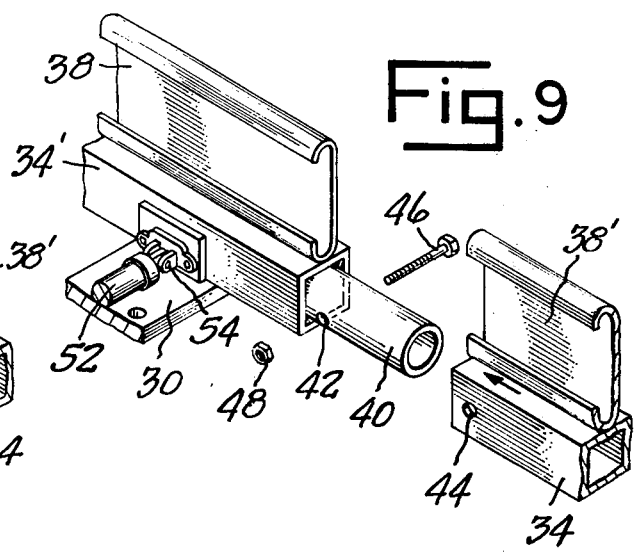
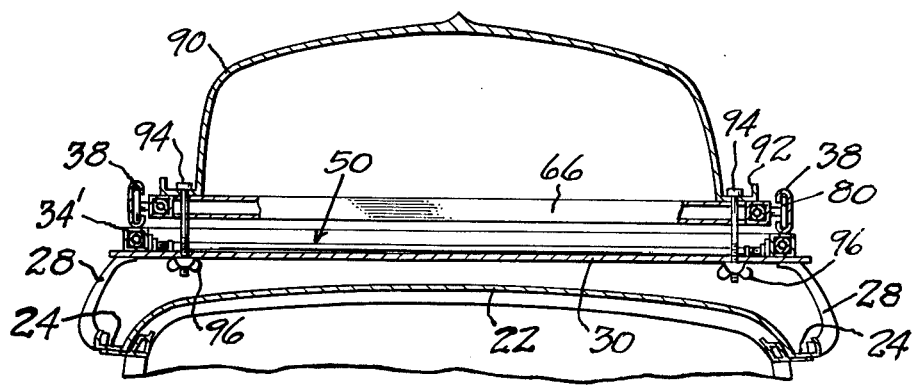

4,058,243

CAR TOP LOAD CARRIER

SUMMARY OF THE INVENTION

This invention relates to improvements in car top load carriers and more particularly to car top boat carriers.

Various types of load carriers adapted for mounting upon the top of a vehicle, such as an automobile or other vehicle having a rigid top structure, have been available heretofore. Such carriers have been subject to various conditions which have rendered usage thereof attendant with problems such as the need of two or more persons to mount and dismount the load, such as a rowboat. Other problems have entailed the risk of damage to the car or the load incident to loading and unloading and difficulty of effecting secure anchorage of the load in transport position.

It is the primary object of this invention to provide a car top load carrier which reduces or minimizes the problems and risks encountered in the use of prior units.

A further object is to provide a car top load carrier having a support frame which is adapted for rigid anchoring to the car top and is provided with track means for mounting a mobile load carrier to which a load can be applied at ground level and which can be manipulated by one person to lift it onto the frame track and advance it to a transport position upon the support frame.

A further object is to provide a device of this character having a fixed support frame mounted upon a vehicle and a wheeled load carrier accommodating trundling thereof with a load from place to place and provided with rollers to transverse guide means upon the fixed support frame.

A further object is to provide a device of this character having a support frame adapted for fixed mounting upon a vehicle and a wheeled or mobile land carrier to be supported upon the support frame, wherein both the support frame and the carrier are formed in sections which are readily separable for ease of handling and for storage in a small space.

Further objects will become apparent from the following specification.

In the drawing:

FIG. 1 is a side elevational view of the device mounted in operative transport position while carrying a load.

FIG. 2 is a side elevational view illustrating one step in the operation of mounting and removing the load.

FIG. 3 is a side elevational view illustrating an intermediate position in the loading and unloading operation of the device.

FIG. 4 is a vertical transverse sectional view taken on line 4—4 of FIG. 1.

FIG. 5A is a perspective view of the mobile part of the load carrier.

FIG. 5B is a perspective view of the fixed support frame of the load carrier in operative position upon a vehicle.

FIG. 6 is an enlarged perspective view of the part encircled in FIG. 5A at 6.

FIG. 7 is a perspective exploded view of the parts illustrated in FIG. 6.

FIG. 8 is a perspective view of the parts encircled at 8 in FIG. 5B.

FIG. 9 is an exploded view of the parts shown in FIG. 8.

FIG. 10 is a vertical transverse sectional view taken on line 10—10 of FIG. 1.

DESCRIPTION OF THE PREFERRED EMBODIMENT

Referring to the drawings which illustrate a preferred embodiment of the invention, the numeral 20 designates a vehicle, such as an automobile, a truck or a trailer, which has a rigid top structure 22. The vehicle top may be characterized by gutters 24 extending at the sides thereof. Two or more bridge type load supports 26 are mounted upon the car top in longitudinally spaced transversely extending positions. Each bridge support includes leg or anchor portions 28 anchored to the car top, as at gutters 24 thereof, and extending above the level of the car top to support a transverse member 30 spanning said leg portions and positioned spaced above the vehicle top 22 as illustrated in FIG. 10.

A rigid support frame 32, as best seen in FIG. 5B, is mounted upon the bridge supports 26. Support frame 32 includes spaced parallel longitudinal tubular members 34 and transverse tubular members 36. In the preferred form the rigid support frame is formed in sections, there preferably being two U-shaped end sections and one or more intervening longitudinal sections of the longitudinal tubular members 34, two such intervening longitudinal sections 34' being shown in FIG. 5B. Each longitudinal tubular member 34' and each side part 34 of each U-shaped end section of the rigid tubular support frame has welded or otherwise fixedly secured thereto a guide or track 38. Track 38 is preferably of C-shape in cross section (as best seen in FIGS. 4, 8 and 9) and is welded at one of the bent marginal portions thereof. The open side of the track is positioned innermost and the opposite inturned flanges of the track are vertically aligned as installed (as best illustrated in FIGS. 8 and 10). The track sections extend to the ends of the tube sections 34 and 34' which abut adjacent tube sections 34 and 34' when operatively interconnected. The track portions 38' carried by the side parts of one of the U-shaped end members of the support frame may project longitudinally beyond the supporting tube therefor, as illustrated in FIGS. 5B.

Any suitable means for interconnecting the tubular members 34 and 34' may be utilized. One construction of such means is best illustrated in FIG. 9 and entails the provision of a tube 40 having a snug fit in the tubes 34 and 34' and welded or otherwise anchored in one of the tubes to be joined, and projecting longitudinally therefrom. The projecting part of tube 40 is provided with spaced opposed openings 42 with which are adapted to register spaced opposed openings 44 in the tube part 34 or 34' to be joined to the tube which carries the projecting tube part 40. A bolt 46 may be passed through the registering openings 42 and 44 when the tube parts 34 and 34' are operatively assembled and a nut 48 may be threaded on bolt 46 to releasably anchor the parts in assembled relation. By this arrangement assured alignment of the various parts of the support frame and of the track members and a strong construction is secured.

The proper lateral spacing of the intermediate longitudinal sections of the rigid support frame may be insured by the provision between opposed frame parts 34' (as seen in FIG. 8) of one or more spacing rods or bars 52 having a pivotal connection at 54 at each end with a bracket 56 carried by tube part 34'. Pivoted hold-down members 58 carried by opposite ends of the part 30 of the bridge support may releasably anchor the opposite intermediate support frame to the bridge support member 30.

A mobile load carrier 60, as best illustrated in FIG. 5A, is adapted to be mounted upon the rigid support frame 32 carried by the vehicle. The carrier 60 has longitudinal members 62, transverse end members 64 and one or more intermediate transverse members 66. The carrier is preferably formed in multiple parts or sections, of which the end sections are preferably of U-shape. One or more intermediate sections are composed of opposed longitudinal sections 62 and a transverse intermediate member 66. The frame members of the carrier are preferably formed of rigid tube stock. The longitudinal sections of the carrier frame are detachably interconnected at each joint, as by a tube 68 snug fitting in the tube sections 62 and anchored to one tube section 62 by welding and including a projecting part slidably received in the other tube section 62 which has transverse apertures 70 therein adapted to register with transverse apertures 72 in the projecting part of tube 68 so as to receive a bolt 74 anchored by nut 76.

The mobile load carrier longitudinal members 62 mount transverse shafts 78 at spaced points. On the outer end of each shaft 78 is journaled a roller 80 in selected spaced relation to the supporting frame member 62 as determined by a spacer 82. Rollers 80 are of a diameter slightly less than the inner dimension of the C-shaped tracks 38 and greater than the spacing of the inner edges of the flanges of said tracks so as to be retained in said tracks. Rollers 80 are preferably positioned similarly along the two longitudinal members of the carrier, that is, the shafts 78 journaling rollers at opposite sides of the carrier are preferably in substantially axial alignment.

At one end of the carrier a pair of wheels 84 are journaled substantially coaxially of the adjacent transverse end frame member 64 so as to project beyond said transverse end member 64. Wheels 84 are of a diameter greater than the diameter of the rollers 80.

The end of the frame of the load carrier at which wheels 84 are journaled preferably includes a load abutment structure 86 of any suitable character which is rigid and projects above the level of the frame of the carrier in the operative position thereof illustrated in FIG. 5A. A pair of pivoted leg members 88 are carried by the longitudinal carrier members 62 adjacent the end of the carrier opposite that provided with the wheels 84. Legs 88 are of a length to accommodate substantial horizontal positioning of the carrier frame when supported upon said legs and the wheels 84.

In the use of the device, a load, such as a boat 90, may be mounted upon the mobile load carrier 60 while the same rests upon the ground in horizontal position supported by its legs 88 and wheels 84. The carrier, so loaded, can readily be moved from place to place by one person who lifts it at the end opposite the wheels and then trundles it from place to place. When the load is a boat or other rigid unit, it is held in operative position on the carrier while trundled by the load abutment structure 86. Also, any suitable anchorage means (not shown) for securely positioning the load upon the carrier may be provided if desired or required.

To load the carrier upon the rigid support frame 32 mounted upon the vehicle, the carrier 60 is trundled to a position at the rear of the vehicle 20 and substantially aligned therewith. The carrier can then be tilted to a greater angle, as illustrated in FIG. 2, to elevate one end thereof to the level of the tracks 38. The carrier, so tilted, can then be advanced toward the vehicle to cause the foremost set of rollers 80 to enter the free or rear ends of the tracks 38' of the support frame, it being understood that the rollers 80 are spaced a distance equal to the spacing between the interior cavities of opposed tracks, and that the carrier frame 60 is of slightly narrower width than the spacing of opposed tracks 38, as best illustrated in FIGS. 4 and 10. This relationship of the parts, together with the rearward projection of the track parts 38' from the support frame 32, permits initial advance of the carrier 60 toward the vehicle while one end thereof is supported by engagement of the rollers 80 in the tracks 38' and the opposite end of the load carrier is supported by the ground engaging wheels 84. After initial advance of the rollers on the tracks 38', the lower end of the load carrier can be elevated manually to position its frame substantially parallel with the tracks of the rigid frame unit, as illustrated in FIG. 3, following which the carrier is advanced upon the support frame to cause engagement and support of the carrier unit by successive sets of rollers 80 engaging, traversing and retained in the tracks 38.

When the carrier is fully supported upon the support frame in the desired transport position, as illustrated in FIG. 1, any suitable anchoring means for maintaining the carrier in transport position may be applied. Thus, as illustrated in FIG. 10, the outwardly projecting flanges or gunwales of a metal fishing boat which bear upon the carrier in the inverted position in which the boat is mounted on the carrier may be anchored to the transverse members 30 of the bridge supports 26 by bolts 94 passed through openings in the gunwale and a member 30 and retained by securing means, such as the wing nuts 96 shown. The operation of loading above described can be accomplished by one person without undue exertion or risk.

Unloading of the carrier can be accomplished by the reverse procedure entailing the steps of releasing the anchoring means 94,96, pulling rearwardly upon the carrier frame to a position substantially as shown in FIG. 3 wherein the engagement of the carrier with the mounting frame is limited to the contact of the foremost rollers 80 in the tracks 38, whereupon the rear end of the carrier can be lowered for contact of the wheels 84 with the ground or pavement. The operator can then move to the front of the carrier and urge it rearwardly as supported by the wheels 84 and the foremost rollers 80 until said rollers are released from the tracks, whereupon the forward end of the carrier can be lowered to a position convenient for trundling of the carrier and its load to a desired location for use or storage. The pivotal mounting of the lege 88 may be of any type desired and accommodates swinging of the legs between operative and inoperative positions as required in the mounting, dismounting and ground support of the carrier and its load.

The device is readily mounted and dismounted relative to the conventional bridge supports 26. Thus the support frame 32 can be mounted upon the bridge supports by positioning the intermediate components of the tubular support frame upon the bridge supports 26, with their adjacent ends interconnected by the telescopic fit of the tubes of one support frame part 34' with a projecting tube part 40 of the adjacent support frame part, followed by interconnection of these parts, as by bolts 46 and nuts 48, and by desired anchorage of the connected support frame parts on the bridge supports 26, as by the hold down members 58. The U-shaped end units of the support frame can then be applied at the opposite ends of the intermediate frame part, being properly oriented by the telescoping interfit of the longitudinal tubes thereof with the projecting tubes 40 of the preassembled intermediate sections.

The various components of the support frame are of a size which can readily be manipulated, positioned and secured in place by one person, and are small enough to accommodate storage in a small storage area. The sectional character of the carrier similarly accommodates ready assembly and disassembly thereof by one person, and convenient storage in a small space. The telescopic interfit of the sections of both the carrier and the frame insure adequate rigidity and strength for use and assembly in the manner above described.

While the preferred embodiment of the invention has been illustrated and described, it will be understood that changes in the construction may be made within the scope of the appended claims without departing from the spirit of the invention.

What I claim is:

1. A car top load carrier comprising
    a rigid elongated support frame having multiple prefabricated sections, means for detachably and telescopically connecting adjacent said frame sections in longitudinal alignment and end abutment,
    means for removably mounting at least some of said support frame sections on the top of a vehicle and cooperating with said frame connecting means to position said frame sections in frame-defining assembled load-bearing relation,
    laterally spaced parallel tracks of C-shaped cross section attached to each section of said support frame at their bottom bent marginal sections and each track abutting and longitudinally aligned with an adjacent track of an adjacent frame section when said sections are connected,
    an elongated load carrying member,
    wheels journaled at one end of said load carrying member,
    a plurality of laterally spaced sets of rollers journaled at spaced intervals along the length of said load carrying member and adapted to traverse said tracks, said tracks retaining said rollers against release transversely from said support frame, and
    means for securing said load carrying member in operative position on said support frame.

2. A car top load carrier as defined in claim 1, wherein
    the tracks at one end of said support frame are open to receive and release said rollers.

3. A car top load carrier as defined in claim 1, wherein
    each of said support frame sections has a pair of laterally spaced longitudinal tubular members.

4. A car top load carrier as defined in claim 3, wherein
    said section connecting means includes a rigid tube having a telescoped fit in said aligned longitudinal tubular members of adjacent sections, each of said last named tubes being fixedly secured to a tubular member of one support frame section and projecting from the end thereof, and means releasably securing the projecting portion of each of said last named tubes within the tubular member of an adjoining support frame section.

5. A car top load carrier as defined in claim 1, and
    a load abutment carried by and projecting above said load carrying member at the wheel mounting end thereof.

6. A car top load carrier as defined in claim 1, wherein
    said tracks project above said support frame with upper and lower flanges thereof positioned innermost, and
    the frame of said load carrying member is narrower than the spacing between said tracks and journals said rollers spaced laterally outwardly thereof to transverse said tracks.

* * * * *